US012267755B2

(12) United States Patent
Holmes et al.

(10) Patent No.: US 12,267,755 B2
(45) Date of Patent: Apr. 1, 2025

(54) REMOTE AIRPORT MANAGEMENT SERVICES

(71) Applicant: SMARTSKY NETWORKS LLC, Morrisville, NC (US)

(72) Inventors: Bruce J. Holmes, Williamsburg, VA (US); Elbert Stanford Eskridge, Jr., Chapel Hill, NC (US); James Evans Ladd, Jr., Hillsborough, NC (US)

(73) Assignee: SMARTSKY NETWORKS LLC, Morrisville, NC (US)

( * ) Notice: Subject to any disclaimer, the term of this patent is extended or adjusted under 35 U.S.C. 154(b) by 597 days.

(21) Appl. No.: 17/625,485

(22) PCT Filed: Jul. 9, 2020

(86) PCT No.: PCT/US2020/041313
§ 371 (c)(1),
(2) Date: Jan. 7, 2022

(87) PCT Pub. No.: WO2021/007384
PCT Pub. Date: Jan. 14, 2021

(65) Prior Publication Data
US 2022/0295247 A1    Sep. 15, 2022

Related U.S. Application Data

(60) Provisional application No. 62/872,411, filed on Jul. 10, 2019.

(51) Int. Cl.
*H04W 4/42* (2018.01)
*G08G 5/00* (2006.01)

(52) U.S. Cl.
CPC ............ *H04W 4/42* (2018.02); *G08G 5/0013* (2013.01); *G08G 5/0095* (2013.01)

(58) Field of Classification Search
CPC .... G08F 5/0013; G08F 5/0026; G08F 5/0043; G08F 5/0082; G08F 5/0091; G08F 5/0095; H04W 4/42
See application file for complete search history.

(56) References Cited

U.S. PATENT DOCUMENTS 5,659,475 A * 8/1997 Brown ................. G08G 5/0026
701/120
6,148,179 A * 11/2000 Wright ................. G08G 5/0021
455/66.1

(Continued)

FOREIGN PATENT DOCUMENTS

WO    2019060354 A1    3/2019

OTHER PUBLICATIONS

International Search Report and Written Opinion of International Application No. PCT/US2020/041313 dated Oct. 30, 2020, all pages cited in its entirety.

*Primary Examiner* — Dung B Huynh
(74) *Attorney, Agent, or Firm* — Burr & Forman LLP (57) ABSTRACT

A system for providing services to remote airports includes a backbone network, an antenna assembly and a remote services module. The backbone network operates using first assigned RF spectrum and is configured to provide backhaul services and network control to operably couple one or more base stations of the backbone network to the Internet. The antenna assembly is disposed at a remote airport to define an airport cell and is configured to communicate wirelessly with an aircraft located in the airport cell via second assigned RF spectrum. The antenna assembly is operably coupled to the backbone network for backhaul to the Internet or an intranet. The remote services module is accessible by the aircraft both in flight and on the ground within the airport cell via the antenna assembly. The remote services module includes processing circuitry configuring the remote ser- (Continued)

vices module to provide the aircraft with access to obtain airside or landside services associated with the remote airport.

19 Claims, 4 Drawing Sheets

(56) References Cited

U.S. PATENT DOCUMENTS

| | | | | |
|---|---|---|---|---|
| 6,160,998 A * | 12/2000 | Wright | | H04B 7/18506 455/66.1 |
| 6,173,159 B1 * | 1/2001 | Wright | | H04B 7/18506 455/66.1 |
| 6,211,809 B1 * | 4/2001 | Stiles | | G01S 13/89 342/60 |
| 6,246,320 B1 * | 6/2001 | Monroe | | G08B 13/19645 342/36 |
| 6,269,309 B1 * | 7/2001 | Buckingham | | G01W 1/10 702/3 |
| 6,359,583 B1 * | 3/2002 | Shamee | | G01S 7/003 342/36 |
| 6,741,841 B1 * | 5/2004 | Mitchell | | H04W 4/42 455/12.1 |
| 6,950,037 B1 * | 9/2005 | Clavier | | G08G 5/0091 342/36 |
| 7,599,691 B1 * | 10/2009 | Mitchell | | H04B 7/18504 455/431 |
| 8,499,324 B1 * | 7/2013 | Mitchell | | H04L 67/02 709/219 |
| 8,612,581 B1 * | 12/2013 | Craig | | H04L 41/069 709/224 |
| 8,700,440 B1 * | 4/2014 | Ande | | G06Q 10/06312 705/5 |
| 9,384,586 B1 * | 7/2016 | McCusker | | G08G 5/0013 |
| 10,001,376 B1 * | 6/2018 | Tiana | | G01C 21/005 |
| 10,153,807 B1 * | 12/2018 | Shi | | H04L 27/0002 |
| 11,146,329 B1 * | 10/2021 | Greenleaf | | H04B 7/18515 |
| 11,393,348 B1 * | 7/2022 | Chartier | | G08G 5/0065 |
| 2002/0109612 A1 * | 8/2002 | Simon | | G08G 5/0091 340/988 |
| 2003/0045994 A1 * | 3/2003 | Stratton | | G08G 5/0043 701/120 |
| 2003/0093187 A1 * | 5/2003 | Walker | | B64D 45/0059 701/1 |
| 2004/0059497 A1 * | 3/2004 | Sankrithi | | G08G 5/0021 701/120 |
| 2004/0142658 A1 * | 7/2004 | McKenna | | H01Q 1/007 455/12.1 |
| 2004/0186897 A1 * | 9/2004 | Knauerhase | | H04L 67/51 709/209 |
| 2004/0203606 A1 * | 10/2004 | Souissi | | H04W 4/12 455/435.1 |
| 2004/0246131 A1 * | 12/2004 | Hodgkinson | | B64D 45/0039 340/541 |
| 2004/0259565 A1 * | 12/2004 | Lucidarme | | H04W 16/18 455/436 |
| 2005/0140540 A1 * | 6/2005 | Rees | | G08G 5/065 342/36 |
| 2006/0040660 A1 * | 2/2006 | Cruz | | H04W 16/12 455/431 |
| 2006/0251115 A1 * | 11/2006 | Haque | | H04W 84/22 370/466 |
| 2007/0072590 A1 * | 3/2007 | Levitan | | G06Q 10/02 455/414.1 |
| 2007/0213009 A1 * | 9/2007 | Higashida | | H04B 7/18508 455/3.06 |
| 2008/0010005 A1 * | 1/2008 | Small | | G08G 5/00 701/120 |
| 2008/0035789 A1 * | 2/2008 | Lewis | | G01P 5/001 244/1 R |
| 2008/0065449 A1 * | 3/2008 | Blagg | | G06Q 10/06311 705/7.13 |
| 2008/0102812 A1 * | 5/2008 | Chari | | H04B 7/10 455/424 |
| 2008/0274734 A1 * | 11/2008 | Kostanic | | H04W 16/28 455/431 |
| 2009/0138873 A1 * | 5/2009 | Beck | | G06F 8/61 717/173 |
| 2010/0002077 A1 * | 1/2010 | Viggiano | | G01S 13/867 348/169 |
| 2010/0042445 A1 * | 2/2010 | Nicosia | | G06Q 10/063114 715/810 |
| 2010/0049009 A1 * | 2/2010 | Muirhead | | H04B 7/18508 370/328 |
| 2010/0049430 A1 * | 2/2010 | Eagles | | G08G 5/0026 701/120 |
| 2010/0231721 A1 * | 9/2010 | Meloche | | G06T 7/30 348/143 |
| 2011/0125349 A1 * | 5/2011 | Ace | | G01S 5/0009 342/52 |
| 2011/0257873 A1 * | 10/2011 | Lussiez | | G06V 20/56 701/120 |
| 2011/0263199 A1 * | 10/2011 | Cruz | | H04B 7/18508 455/12.1 |
| 2012/0143405 A1 * | 6/2012 | Cabos | | G07C 5/008 701/3 |
| 2012/0210387 A1 * | 8/2012 | Sampigethaya | | G08G 5/0013 726/1 |
| 2012/0315905 A1 * | 12/2012 | Zhu | | H04W 36/362 455/436 |
| 2013/0046422 A1 * | 2/2013 | Cabos | | G08G 5/0021 701/120 |
| 2013/0132548 A1 * | 5/2013 | Cabos | | H04L 67/12 709/223 |
| 2013/0184977 A1 * | 7/2013 | Venkatasubramanian | | G05D 1/0289 701/117 |
| 2013/0219014 A1 * | 8/2013 | Yerli | | G06F 16/29 709/217 |
| 2014/0075506 A1 * | 3/2014 | Davis | | H04B 7/18508 726/3 |
| 2014/0177840 A1 * | 6/2014 | Liu | | H04W 28/0846 370/235 |
| 2014/0197980 A1 * | 7/2014 | Schulte | | G08G 5/0021 342/37 |
| 2014/0253369 A1 * | 9/2014 | Kelley | | G01S 19/074 342/175 |
| 2014/0282747 A1 * | 9/2014 | Richman | | H04W 76/15 725/62 |
| 2014/0378079 A1 * | 12/2014 | Adnani | | H04B 1/16 455/266 |
| 2015/0156601 A1 * | 6/2015 | Donnellan | | H04W 12/35 455/41.1 |
| 2015/0215899 A1 * | 7/2015 | Kumar | | H04L 67/12 455/62 |
| 2016/0055275 A1 * | 2/2016 | Wang | | G09B 9/08 703/8 |
| 2016/0095038 A1 * | 3/2016 | Kuwahara | | H04B 7/18506 455/438 |
| 2016/0112852 A1 * | 4/2016 | Sarma | | G06Q 50/14 455/414.1 |
| 2016/0180715 A1 * | 6/2016 | Burke | | G08G 5/0091 701/467 |
| 2016/0189551 A1 * | 6/2016 | Pereira | | G08G 5/0021 701/532 |
| 2016/0205560 A1 * | 7/2016 | Hyslop | | H04B 7/18506 455/454 |
| 2016/0205724 A1 * | 7/2016 | Shi | | H04W 92/02 370/254 |
| 2016/0226574 A1 * | 8/2016 | LaMarca | | H04W 84/005 |
| 2016/0260335 A1 * | 9/2016 | Chenna | | G08G 5/065 |
| 2016/0269274 A1 * | 9/2016 | Anandappan | | H04B 7/185 |
| 2016/0286242 A1 * | 9/2016 | Easterling | | H04N 21/41407 |
| 2016/0365917 A1 * | 12/2016 | Small | | H04W 64/00 |
| 2016/0374001 A1 * | 12/2016 | Desmarais | | H04W 48/16 |
| 2017/0140656 A1 * | 5/2017 | Mott | | G01S 19/03 |
| 2017/0259942 A1 * | 9/2017 | Ziarno | | F02C 9/00 |
| 2018/0061243 A1 * | 3/2018 | Shloosh | | G08G 5/0043 |

(56) References Cited

U.S. PATENT DOCUMENTS

| | | | | |
|---|---|---|---|---|
| 2018/0144646 A1* | 5/2018 | Nitzan | ............... | G08G 5/0026 |
| 2018/0181144 A1* | 6/2018 | Steinmann | ............ | G06Q 40/08 |
| 2018/0182251 A1* | 6/2018 | Burgess | ............ | H04B 7/18506 |
| 2018/0197301 A1* | 7/2018 | Anderson | ............... | G08G 5/06 |
| 2018/0217599 A1* | 8/2018 | Groden | ............... | G08G 5/0013 |
| 2018/0218620 A1* | 8/2018 | Kalyan | ............... | G08G 5/0043 |
| 2018/0241463 A1* | 8/2018 | Lu | .................... | H04W 84/18 |
| 2018/0268718 A1* | 9/2018 | Srivastav | ............ | G08G 5/025 |
| 2019/0045348 A1* | 2/2019 | Li | ........................ | H04W 16/28 |
| 2019/0052349 A1* | 2/2019 | Russell | ............ | H04B 7/18506 |
| 2019/0069261 A1* | 2/2019 | Nygren | ............ | H04W 52/0229 |
| 2019/0110334 A1* | 4/2019 | Raje | ................... | H04W 88/085 |
| 2019/0223237 A1* | 7/2019 | Hong | .................. | H04L 63/105 |
| 2019/0266277 A1* | 8/2019 | Lautenschlaeger | ......................... | G06F 16/2322 |
| 2019/0311631 A1* | 10/2019 | Holmes | ............... | G08G 5/0039 |
| 2020/0043347 A1* | 2/2020 | Wartofsky | .......... | G08G 5/0082 |
| 2020/0105131 A1* | 4/2020 | Carter | ................. | G08G 1/0133 |
| 2020/0118450 A1* | 4/2020 | Gariel | ................ | G05D 1/0088 |
| 2020/0128358 A1* | 4/2020 | Komoni | ............. | H04W 4/027 |
| 2020/0143691 A1* | 5/2020 | Sidiropoulos | ........ | G08G 5/0043 |
| 2020/0226940 A1* | 7/2020 | Srinivasan | ........... | G08G 5/0078 |
| 2020/0312159 A1* | 10/2020 | Hegranes | ........... | H04B 7/18506 |
| 2020/0320885 A1* | 10/2020 | Subramaniyan | ..... | G08G 5/0034 |
| 2020/0329354 A1* | 10/2020 | Rashid | ................... | H04W 4/70 |
| 2020/0349852 A1* | 11/2020 | DiCosola | ............. | G08G 5/0069 |
| 2020/0372809 A1* | 11/2020 | Ganti | ................... | G08G 5/0052 |
| 2020/0378791 A1* | 12/2020 | Hausmann | .............. | G01S 13/89 |
| 2021/0014260 A1* | 1/2021 | Singh | ................... | H04L 41/40 |
| 2022/0030225 A1* | 1/2022 | Engström | ............ | H04N 19/107 |
| 2022/0187472 A1* | 6/2022 | Cote | .................... | G08G 5/0043 |
| 2022/0223052 A1* | 7/2022 | Holmes | ............... | G08G 5/0091 |
| 2023/0262611 A1* | 8/2023 | Kuriki | ............... | H04W 52/243 |
| | | | | 455/522 |

* cited by examiner

REMOTE AIRPORT MANAGEMENT SERVICES

CROSS REFERENCE TO RELATED APPLICATIONS

This application claims priority to U.S. application No. 62/872,411 filed on Jul. 10, 2019, the entire contents of which are hereby incorporated by reference in its entirety.

TECHNICAL FIELD

Example embodiments generally relate to wireless communications and, more particularly, relate to providing remote airport management and interaction with aircraft at unattended airports via wireless communication links, airside and land-side software systems, and backhaul infrastructure.

BACKGROUND

There are nearly 20,000 airports in the United States. Of these airports, only about a quarter are public use airports. Of those, only about ¾ have lighted and/or paved runways. Moreover, for the nearly 15,000 smaller private and public use airports in the United States, far fewer are lighted and/or paved. Many of these smaller airports have limited connectivity services (i.e., poor cellular coverage) due to their remote locations, at the edges of the service volumes of many cellular carriers. Since most Americans used the largest and busiest airports, the fact that there are a vast number of much smaller, and much less well resourced, airports in the country is not fully appreciated. However, particularly for business aviation and private pilots, and more generally for pilots who are not employed in commercial aviation, the disparity in resources available at airports can have a significant impact on safety and efficiently planning and executing a flight mission.

Another situation that can have significant impacts on planning and executing a flight plan is knowing whether an airport is an "unattended" airport. Unattended airports often lack a control tower, radar surveillance, or other resources with which to communicate with regarding airport conditions, traffic flows, instructions, or to otherwise facilitate access to services in the air or on the ground. Unattended airports can therefore be a challenge to fly into, since turning on runway lights, or getting other instructions regarding where to go and what to do for services at an unattended airport can be a challenge. This can be particularly problematic for a pilot's first visit to an unattended airport.

By leveraging the backhaul capability of a nationwide communication network, and further due to the relative ease with which wireless coverage can be created in specific geographic locations, it may be possible to make even remote airports into a connectivity-based "bubble" inside which communication is possible, and via which a number of useful services can be provided to incoming and departing aircraft. Accordingly, some example embodiments provide tools by which to reduce some of the issues described above dramatically.

BRIEF SUMMARY OF SOME EXAMPLES

Some example embodiments may provide a communication structure capable of providing services to remote, and even unattended airports.

In one example embodiment, a system for providing services to remote airports is provided. The system may include a backbone network, an antenna assembly and a remote services module. The backbone network may operate using first assigned RF spectrum and be configured to provide backhaul services and network control to operably couple one or more base stations of the backbone network to the Internet. The antenna assembly may be disposed at a remote airport to define an airport cell and is configured to communicate wirelessly with an aircraft located in the airport cell via second assigned RF spectrum. The antenna assembly may be operably coupled to the backbone network for backhaul to the Internet. The remote services module may be accessible by the aircraft both in flight and on the ground within the airport cell via the antenna assembly. The remote services module may include processing circuitry configuring the remote services module to provide the aircraft or communication devices thereon with access to obtain airside or landside services associated with the remote airport.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal and regulatory requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

As used in herein, the term "module" is intended to include a computer-related entity, such as but not limited to hardware, firmware, or a combination of hardware and software (i.e., hardware being configured in a particular way by software being executed thereon). For example, a module may be, but is not limited to being, a process running on a processor, a processor (or processors), an object, an executable, a thread of execution, and/or a computer. By way of example, both an application running on a computing device and/or the computing device can be a module. One or more modules can reside within a process and/or thread of execution and a module may be localized on one computer and/or distributed between two or more computers. In addition, these components can execute from various computer readable media having various data structures stored thereon. The modules may communicate by way of local and/or remote processes such as in accordance with a signal having one or more data packets, such as data from one module interacting with another module in a local system, distributed system, and/or across a network such as the Internet with other systems by way of the signal. Each respective module may perform one or more functions that will be described in greater detail herein. However, it should be appreciated that although this example is described in terms of separate modules corresponding to various functions performed, some examples may not necessarily utilize modular architectures for employment of the respective different functions. Thus, for example, code may be shared between different modules, or the processing circuitry itself may be configured to perform all of the functions described as being associated with the modules described herein. Furthermore, in the context of this disclosure, the term "module" should not be understood as a nonce word to identify any generic means for performing functionalities of the respective modules. Instead, the term "module" should be understood to be a modular component that is specifically configured in, or can be operably coupled to, the processing circuitry to modify the behavior and/or capability of the processing circuitry based on the hardware and/or software that is added to or otherwise operably coupled to the processing circuitry to configure the processing circuitry accordingly.

Some example embodiments described herein provide a system, architectures and/or methods for improved real time services provision to aircraft at remote airports (or unattended airports). In this regard, some example embodiments may provide a system that enables connection of remote airports to the Internet (or to a private, secure intranet) using a nationwide network as a backbone for backhaul. A remote services module may then be assigned to the airport in order to enable airside and landside services to be provided to the airport via the public Internet, or a private and secure intranet. Real time and advanced services may be scheduled or otherwise provided to increase safety and convenience even in remote or unattended locations. These services provide connectivity for flight deck applications over mobile devices or installed avionics systems, as well as for passenger connectivity services. Moreover, the cost of providing services can be drastically reduced even for attended airports due to the ability to manage (automatically or manually) the provision of services at the airports using the remote services module.

Figure 1:
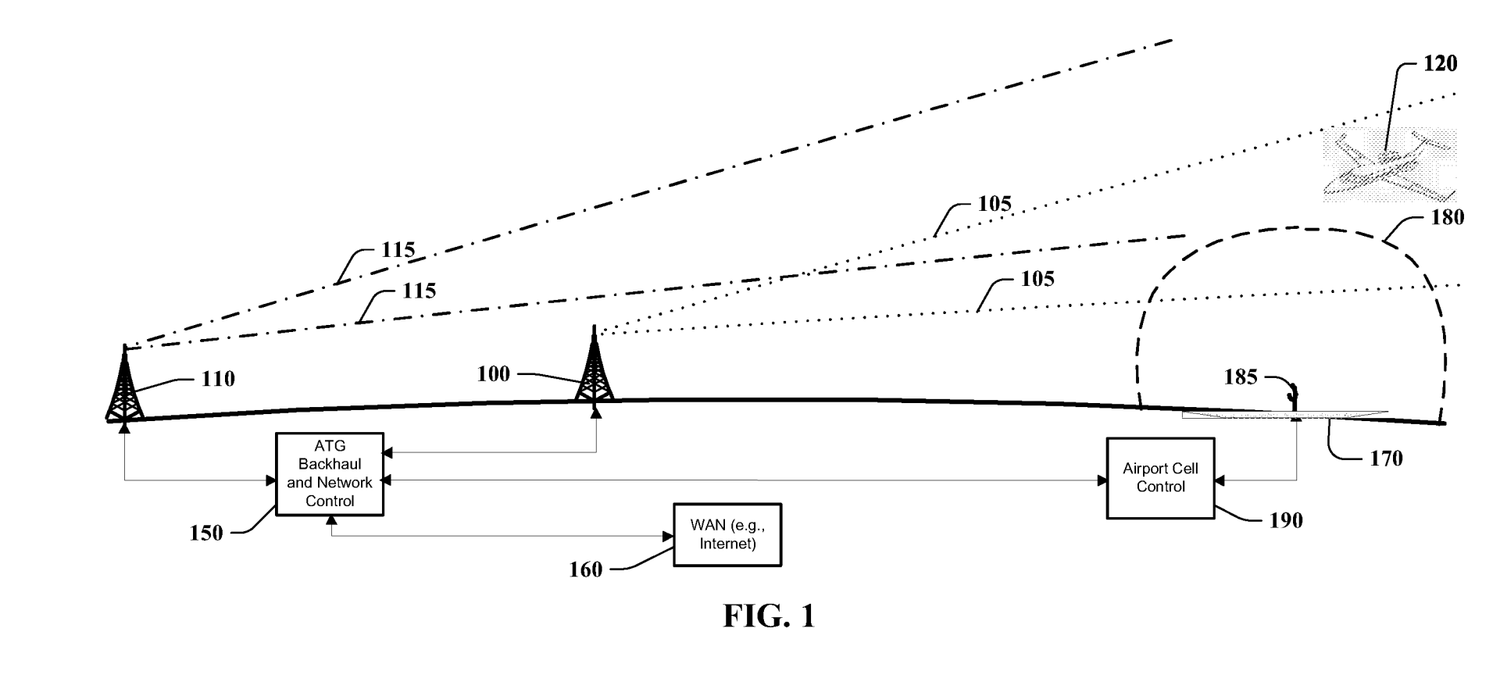
FIG. 1 illustrates a block diagram of a network architecture for providing services to remote airports in accordance with an example embodiment.

FIG. 1 illustrates an example network architecture for providing management services to a remote airport. FIG. 1 shows only two dimensions (e.g., an X direction in the horizontal plane and a Z direction in the vertical plane), however it should be appreciated that the coverage illustrated also extends in directions into and out of the page (i.e., in the Y direction). Although FIG. 1 is not drawn to scale, it should be appreciated that the wedge shaped cells generated by the base stations for the ATG network shown may be configured to have a much longer horizontal component than vertical component. In this regard, the wedge shaped cells may have a horizontal range on the order of dozens to nearly or more than 100 miles. Meanwhile, the vertical component expands with distance from the base stations, but is in any case typically less than about 8 miles (e.g., about 45,000 ft). Additionally, it should be appreciated that the ATG network of FIG. 1 is merely one example of a nationwide network to which an airport cell of an example embodiment may be connected for backhaul. The fact that the backhaul is provided by an ATG network may provide certain additional capabilities, some of which are described herein. However, the backhaul would not necessarily need to be provided by an ATG network. Thus, any network used to provide backhaul may have a similar or different architecture and may employ a different portion of the RF spectrum than the airport cell. For example, a terrestrial network, an ATG network with a different network architecture, or even a satellite network could either augment or replace the ATG network in FIG. 1.

As shown in FIG. 1, a first ATG base station 100 and a second ATG base station 110, which are examples of base stations employed in the ATG network as described above (e.g., employing wedge shaped cells) may be operating in a particular geographic area. The first ATG base station 100 may be deployed substantially in-line with the second ATG base station 110 along the X axis and may generate a first wedge shaped cell (defined between boundaries 105) that may be layered on top of a second wedge shaped cell (defined between boundaries 115) generated by the second ATG base station 110. When an in-flight aircraft 120 is exclusively in the first wedge shaped cell, the aircraft 120 (or wireless communication assets thereon) may communicate with the first ATG base station 100 using first assigned RF spectrum (e.g., unlicensed spectrum) and when the aircraft 120 is exclusively in the second wedge shaped cell, the aircraft 120 (or wireless communication assets thereon) may communicate with the second ATG base station 110 using the first assigned RF spectrum. The communication may be accomplished using beamforming to form or steer a beam toward the aircraft 120 within either the first or second wedge shaped cell based on knowledge of the location of the aircraft 120. An area of overlap between the first wedge shaped cell and the second wedge shaped cell may provide the opportunity for handover of the in-flight aircraft 120 between the first ATG base station 100 and the second ATG base station 110, respectively. Beamforming may thus be used by each of the first and second base stations 100 and 110 to steer or form respective beams for conduct of the handover. Accordingly, uninterrupted handover of receivers on the in-flight aircraft 120 may be provided while passing between coverage areas of base stations of the first ATG network having overlapping coverage areas as described herein.

In an example embodiment, the ATG network may include ATG backhaul and network control components 150 that may be operably coupled to the first and second ATG base stations 100 and 110. The ATG backhaul and network control components 150 may generally control allocation of the first assigned RF spectrum and system resources of the ATG network. The ATG backhaul and network control components 150 may also provide routing and control services to enable the aircraft 120 and any UEs and other wireless communication devices thereon (i.e., wireless communication assets on the aircraft 120) to communicate with each other and/or with a wide area network (WAN) 160 such as the Internet.

In an example embodiment, the wedge shaped cells generated by the first and second ATG base stations 100 and 110 may create an architecture that aims overlapping wedges of coverage toward the horizon. Thus, the spatial relationships shown in FIG. 1 should be appreciated to create the potential for a minimum altitude for reliable coverage by the ATG network. For example, below an altitude of 3000 ft or 5000 ft, there may be areas (e.g., near and in the aiming direction of each of the ATG base stations) where coverage by the ATG network is possible, whereas there are other areas (e.g., near and opposite the aiming direction of each of the ATG base stations) where coverage by the ATG network is either not possible, or not reliable.

The potential coverage gaps of the ATG network at low altitudes may actually serve as an advantage in terms of avoiding interference with other ground-based transmitters and receivers. Thus, the first assigned RF spectrum associated with the ATG network could be used on the ground for other purposes with reduced or no interference. However, this also means that to the extent an airport 170 is located in a remote area, the airport 170 generally could not receive wireless communication services from the ATG network in a direct way. In other words, the ATG network could not use the first and second base stations 100 and 110 (or any other base stations of the ATG network) to provide a reliable blanket of connectivity to the airport 170 using the base stations that are otherwise in normal operation to define the overlapping wedges of the ATG network. That said, particularly to the extent that the ATG network (or any other wireless communication network including terrestrial networks) is a nationwide network, backhaul connection may be made to the airport 170 so that an airport cell 180 of an example embodiment can be set up as described herein.

In this regard, an antenna assembly 185 may be set up at the airport 170 to provide the airport cell 180 as a wireless communication coverage area around the airport 170. The antenna assembly 185 may then be operably coupled to airport cell control components 190, which may be further operably coupled the ATG backhaul and the ATG backhaul and network control components 150. Thus, the ATG network may provide backhaul for the airport cell 180 ultimately operably coupling the airport cell 180 to the WAN 160 (e.g., the Internet).

The airport cell 180 could operate using the first assigned RF spectrum due to the advantageous architecture for interference reduction, as described above. However, the airport cell could alternatively utilize second assigned RF spectrum that is different than the first assigned RF spectrum. In some cases, the aircraft 120 may be enabled to connect to the WAN 160 via the ATG network while at altitude, and then switch to the airport cell 180 when within range (e.g., while making an approach to land at the airport 170). When taking off, the reverse situation may occur. For example, the aircraft 120 may be connected to the airport cell 180 while on the ground and after takeoff and then transition to the ATG network when at altitude. However, as noted above, example embodiments can be practiced without any connectivity to the aircraft 120 at altitude in some cases. In those cases, the ATG network (or some other terrestrial network) may simply be used for backhaul connection and operable coupling to the WAN 160.

The antenna assembly 185 may be, in some cases, an omnidirectional antenna or set of antennas. Thus, the airport cell 180 may provide coverage a given distance in all directions (except through the ground) around the antenna assembly 185. The aircraft 120 (e.g., via configured radio equipment on board) may be able to wirelessly communicate with assets or individuals connected to the ATG network and/or the WAN 160 via the airport cell 180. Moreover, multiple aircraft (or corresponding instances of configured radio equipment—including individual user equipment such as cell phones, laptops or other devices having radio equipment configured to communicate with the airport cell 180) may be able to simultaneously communicate with the airport cell 180 when inside the given distance from the antenna assembly 185.

As will be discussed in greater detail below, the ability of the aircraft 120 (or devices thereon) to communicate with the antenna assembly 185, and thereby also (via the backhaul of the ATG network) the WAN 160, may enable a number of services to be provided to the aircraft 120 that would otherwise not be possible at remote or unattended airports. These services can be exclusively provided based on and via the connection to the airport cell 180 or may be combined with other services that are available via the ATG network when the backhaul services happen to be provided by an ATG network as described herein. Moreover, the architecture of FIG. 1 can be duplicated, even on a mass scale, to provide services to many remote airports across vast geographic regions. A system capable of providing services in such an environment is shown, for example, in FIG. 2.

In an example embodiment, beamforming control modules may be employed at the base stations of the ATG network. These beamforming control modules may use location information provided by components of the respective networks to direct beamforming to the location of the aircraft 120. When an intra-network handover (e.g., a handover between the first and second base stations 100 and 110) is conducted, the ATG network may be fully equipped to share the location information between the base stations. Thus, for example, the ATG backhaul and network control components 150 may be configured to provide an ability for the first ATG base station 100 and the second ATG base station 110 to each be informed of the location of the aircraft 120 for handovers between the first and second ATG base stations 100 and 110. This information (i.e., location information for the aircraft 120) could also be shared with the airport cell control components 190 so that the airport cell 180 is effectively also made aware of the location of the aircraft 120. In some cases, vehicle-to-vehicle (V2V) communication may also be employed to share location information. This sharing of location information between vehicles and/or between assets in the network may be useful in connection with service provision as described in greater detail below. These communications functions will enable safe and efficient airspace utility for the evolving Urban and Regional Air Mobility and Unmanned Aerial Systems operations throughout the world.

In example embodiments, either the aircraft 120 or wireless communication assets thereon may have a first radio configured to interface with the first and second ATG base stations 100 and 110 of the ATG network and a second radio configured to interface with the airport cell 180. However, the first and second radios could be the same equipment, but capable of being configured to communicate with each respective base station or antenna assembly. The first and second radios may therefore be configured to operate in the corresponding first and second assigned RF spectrum in order to stay operably coupled to respective system components.

In some cases, the ATG network may be replaced by other networks, so the option to communicate with the aircraft 120 at altitude need not be a necessary component of example embodiments. However, additional services can be provided to the aircraft 120 via the ATG network in cases where the backbone of the system is provided by the ATG network. In some cases, a handover could be conducted between the ATG network and the airport cell 180. However, in other cases, communications with the airport cell 180 may be conducted independent of communications conducted with the ATG network. Whether or not communications are handed over or conducted separately, in situations in which the backbone of the system is provided by the ATG network, useful information may be shared from the ATG network for the provision of remote services as described below.

Figure 2:
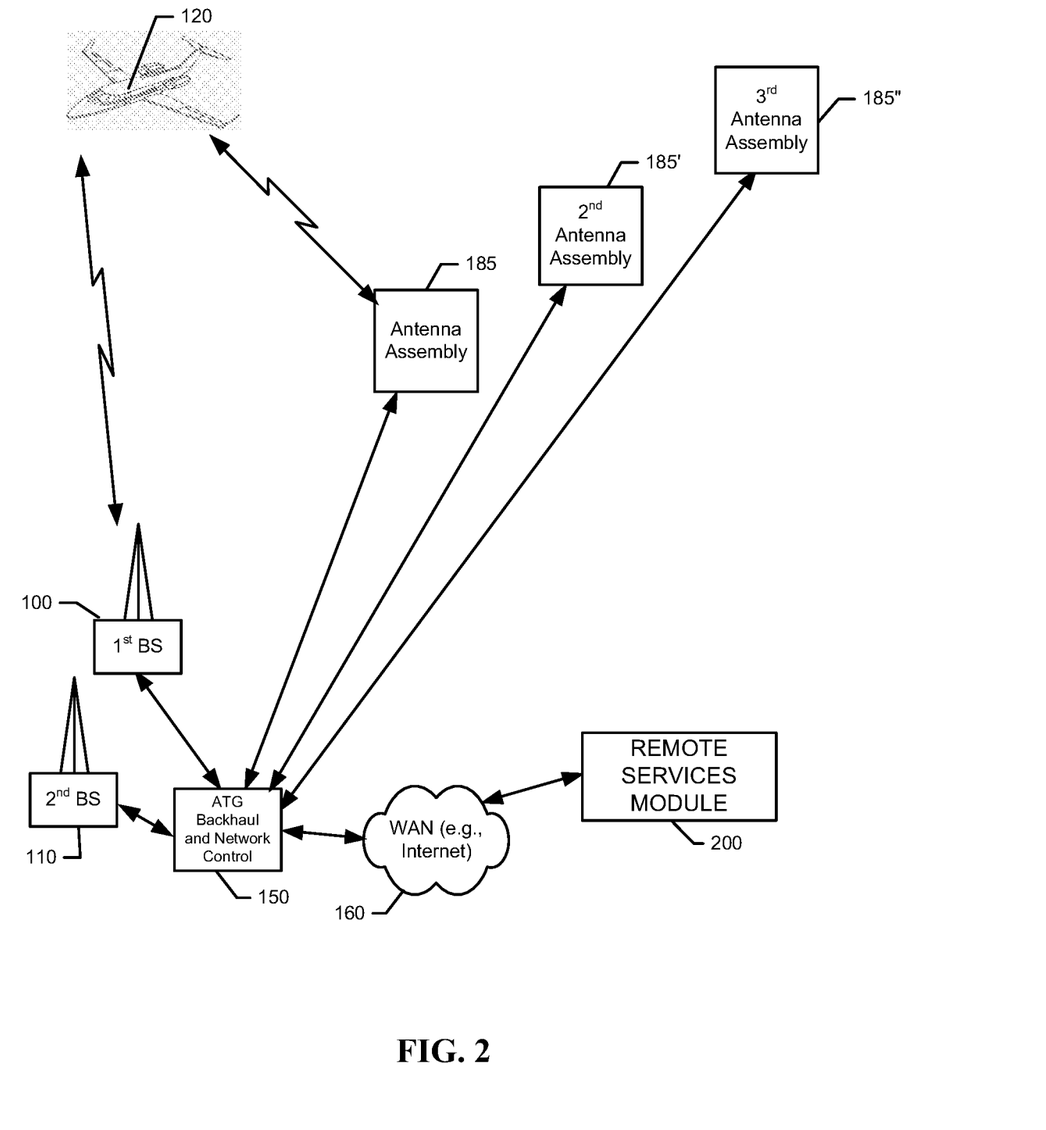
FIG. 2 illustrates a block diagram of a system for providing airside and landside services to remote airports in accordance with an example embodiment.

FIG. 2 illustrates a block diagram of various components of a system, which may include one or more airport cells that may be employed to communicate with the aircraft 120 at respective different remote airports according to an example embodiment. In this regard, although FIG. 2 shows structure for supporting three different airport cells, it should be appreciated that many more than three airport cells could be supported in some cases. Moreover, it should also be appreciated that when loading balance is desired, the architecture shown in FIG. 2 could be duplicated any number of times to further support nationwide coverage of a multitude of remote or unattended airports using distributed (e.g., on a geographic basis) assets such as those shown in FIGS. 2 and 3.

As shown in FIG. 2, the wireless communication network providing the backbone for the system may be an ATG network such as the one shown in FIG. 1. Thus, for example, the first and second base stations 100 and 110 may be operably coupled to the WAN 160 via the ATG backhaul and network control components 150 as described above. The first base station 100, the second base station 110 or another base station (or combination of base stations) may provide wireless communication coverage for aircraft at altitude above corresponding airports and airport cells associated with the antenna assembly 185 and other antenna assemblies associated with corresponding respective different airports and airport cells. The respective different airports and airport cells may include a second airport and second airport cell that are served via a $2^{nd}$ antenna assembly 185' and a third airport and third airport cell that are served via a $3^{rd}$ antenna assembly 185".

As can be appreciated from the situation described above, each of the airports may receive remote services via the backhaul service provided by the wireless communication network (i.e., the ATG network in this example) and corresponding instances of an antenna assembly. The remote services may be provided by a remote services module 200 that may be located "in the cloud" (e.g., at a server, computer or other asset accessible via the Internet). However, in some cases, the remote services module 200 could be a part of the ATG backhaul and network control components 150. Regardless of where the remote services module 200 is physically located within the system, the remote services module 200 may be configured to communicate with aircraft or other devices that are located at the respective airports associated with the antenna assembly 185, the $2^{nd}$ antenna assembly 185' and the $3^{rd}$ antenna assembly 185" through the system architecture described above. Moreover, as noted above, the remote services module 200 may also receive information from the ATG network (e.g., from a network controller, or other network components) that may be useful with respect to the provision of remote services to the aircraft 120 (or any other aircraft or devices that can communicate to the remote services module 200).

In some cases, a single instance of the remote services module 200 may communicate with each and every airport cell and antenna assembly in the system. However, in other cases, a given number of antenna assemblies and corresponding airport cells may be divided up between separate instances of the remote services module 200. The airports and antenna assemblies associated with a particular instance of the remote services module 200 can be determined with respect to a number of different potential distinctions. For example, in some cases, airports in a particular geographic region may be associated with one instance of the remote services module 200, and airports in other regions may be associated with other respective instances of the remote services module 200. In other examples, airports may be paired with or otherwise associated with respective different instances of the remote services module 200 based on airport size, traffic volume, traffic density, hours of operation (for remote services), time zone, etc. In relation to the characteristics described above, airports having similar characteristics could be grouped together with a single instance of the remote services module 200. However, in some cases, airports having dissimilar characteristics could be grouped together to provide a type of load balancing for remote services. For example, rather than servicing all busy airports (which therefore all share a high traffic volume characteristic) by the same instance of the remote services module 200, airports could be ranked by traffic volume an distributed to respective instances of the remote services module 200 in a manner that balances the loading amongst all of the modules. Also for example, a benefit of the air-side services enabled by this system is related to overcoming existing operating constraints in airport terminal airspace that is not surveilled by radar. Under those existing constraints, Air Traffic Control manages separation services using "procedural" procedures. This means that an aircraft arriving or departing from an airport without radar services (which are most airports in the U.S.), must wait (for example) for other aircraft to "time-out" or report in to ATC before being allowed in or out of the subject airspace. As a result, aircraft are held in the air or on the ground waiting for these procedural or time-based limits to be completed.

Figure 3:
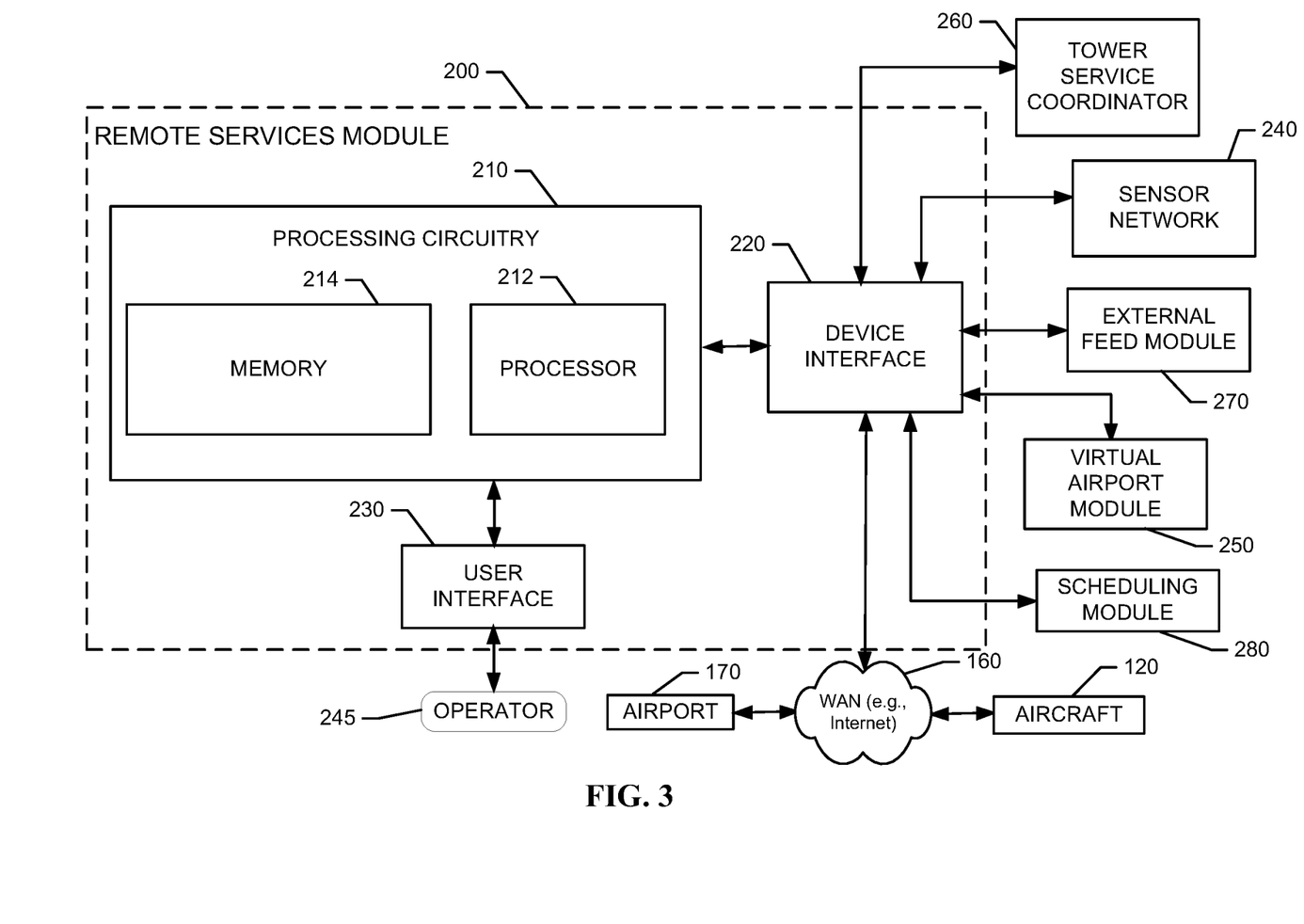
FIG. 3 illustrates a block diagram of a remote services module in accordance with an example embodiment.

Regardless of the number of instances of the remote services module 200, or how each remote services module is assigned to respective airports, the services provided thereby will be described in greater detail in reference to FIG. 3. In this regard, FIG. 3 illustrates a block diagram of the remote services module 200 of an example embodiment. As shown in FIG. 3, the remote services module 200 may include processing circuitry 210 configured to perform data processing, control function execution and/or other processing and management services according to an example embodiment of the present invention. In some embodiments, the processing circuitry 210 may be embodied as a chip or chip set. In other words, the processing circuitry 210 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The processing circuitry 210 may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry 210 may include one or more instances of a processor 212 and memory 214 that may be in communication with or otherwise control a device interface 220. As such, the processing circuitry 210 may be embodied as a circuit chip (e.g., an integrated circuit chip) configured (e.g., with hardware, software or a combination of hardware and software) to perform operations described herein. In some embodiments, the processing circuitry 210 may communicate with various internal and/or external components, entities, modules and/or the like, e.g., via the device interface 220. The processing circuitry 210 may also communicate with one or more instances of either sensors or electronic devices associated with the airport 170 at which the antenna assembly 185 is located. These sensors or devices may be part of a sensor network 240. The sensor network 240 may provide information about weather conditions at the airport 170 based on actual observation (as opposed to reports from weather services, which could also or alternatively provide weather information for the airport 170). Thus, for example, the sensor network 240 may include thermometers, atmospheric pressure sensors, rain gauges, light sensors, cameras, and/or the like for determining weather conditions. However, it should be appreciated that sensors like cameras may have other uses as well, such as providing remote operators (or pilots) with real-time views of conditions at the airport 170 (e.g., on the runway, at the terminal, at parking locations, at service locations, etc.). The sensors (such as movement sensors or the camera) may also indicate when animals, vehicles or other obstructions are blocking all or portions of a runway or other traffic areas of the airport 170.

The device interface 220 may include one or more interface mechanisms for enabling communication with other internal and/or external devices (e.g., modules, entities, sensors and/or other components of the networks and/or airports). In some cases, the device interface 220 may be any means such as a device or circuitry embodied in either hardware, or a combination of hardware and software that is configured to receive and/or transmit data from/to modules, entities, sensors and/or other components of the networks, aircraft and/or airports that are in communication with the processing circuitry 210. In this regard, for example, the device interface 220 may be configured to operably couple the processing circuitry 210 to the sensor network 240, and/or to various external entities or components (including flight control entities, aircraft themselves, weather services, etc.) that may provide various types of information including traffic information, weather information, and numerous other types of information associated with the airport 170, the aircraft 120 and services associated therewith, which could be managed, optimized or otherwise considered. These other types of information or services may include maintenance, logistics, runway use, runway lighting, queuing, tower services, management information and/or the like.

The processor 212 may be embodied in a number of different ways. For example, the processor 212 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor 212 may be configured to execute instructions stored in the memory 214 or otherwise accessible to the processor 212. As such, whether configured by hardware or by a combination of hardware and software, the processor 212 may represent an entity (e.g., physically embodied in circuitry—in the form of processing circuitry 210) capable of performing operations according to embodiments of the present invention while configured accordingly. Thus, for example, when the processor 212 is embodied as an ASIC, FPGA or the like, the processor 212 may be specifically configured hardware for conducting the operations described herein. Alternatively, as another example, when the processor 212 is embodied as an executor of software instructions, the instructions may specifically configure the processor 212 to perform the operations described herein.

In an example embodiment, the processor 212 (or the processing circuitry 210) may be embodied as, include or otherwise control the operation of the remote services module 200. As such, in some embodiments, the processor 212 (or the processing circuitry 210) may be said to cause each of the operations described in connection with the remote services module 200. The processor 212 may also control function execution and instruction provision related to operations of the remote services module 200 based on execution of instructions or algorithms configuring the processor 212 (or processing circuitry 210) accordingly. In particular, the instructions may include instructions for determining which information and/or services to provide to the airport 170 and/or the aircraft 120, and then the provision of such information and/or services.

In an exemplary embodiment, the memory 214 may include one or more non-transitory memory devices such as, for example, volatile and/or non-volatile memory that may be either fixed or removable. The memory 214 may be configured to store information, data, applications, instructions or the like for enabling the processing circuitry 210 to carry out various functions in accordance with exemplary embodiments of the present invention. For example, the memory 214 could be configured to buffer input data for processing by the processor 212. Additionally or alternatively, the memory 214 could be configured to store instructions for execution by the processor 212. As yet another alternative, the memory 214 may include one or more databases that may store a variety of data sets associated with the traffic information, weather information and/or other airport services that can be provided by the remote services module 200. Among the contents of the memory 214, applications and/or instructions may be stored for execution by the processor 212 in order to carry out the functionality associated with each respective application/instruction.

The remote services module 200 may be configured to provide services to the airport 170 and/or aircraft 120 (or other communication devices) at or near the airport 170 from a remote location. In some cases, a human operator 245 may interact with the remote services module 200 via a user interface 230. The operator 245 may be physically located at a call center, an air traffic control facility, or other remote control facility from which services can be provided via the airport cell 180 and the structures shown in FIGS. 1 and 2. Thus, for example, there may be multiple operators associated each with a single instance of the remote services module 200, or where some (or all) operators are associated with more than one instance of the remote services module 200. Thus, one or more operators may be associated with one or more respective instances of the remote services module 200.

The operator 245 may, for example, establish voice, video and/or data communication with the aircraft 120 (e.g., via the antenna assembly 185) to take requests for services or provide services when the aircraft 120 is within the airport cell 180. Thus, in some cases, the operator 245 may be an integral part of the remote service provision capabilities of the system in a real-time environment. In this regard, for example, the operator 245 may effectively act as an air traffic controller or other tower personnel for the airport 170 even though the operator 245 is physically located quite distant from the airport 170. The data gathered by the sensor network 240 may therefore be equally important to both the aircraft 120 and the operator 245, and both may utilize such data in real time, or in near real time. However, in other cases, the operator 245 may interact with the remote services module 200 in order to establish rules, schedules, updates, or otherwise provide information for the remote services module 200 to utilize during automated operation when services are requested by an airport or aircraft. In those purely automated operation situations, the aircraft 120 may interact with the remote services module 200, which may make real time decisions and serve information, instructions, guidance or the like to the aircraft 120 without any human interaction on the airport 170 side.

In an example embodiment, the remote services module 200 may include or otherwise be in communication with various other modules or components that are employed in connection with service provision. For example, in addition to the sensor network 240 described above, the remote services module 200 may include or otherwise be in communication with (e.g., device interface 220) a virtual airport module 250, a tower service coordinator 260, an external feed module 270, and a scheduling module 280. Each of the virtual airport module 250, the tower service coordinator 260, the external feed module 270, and the scheduling module 280 may include their own respective instances of processing circuitry that may be similar in form or function to that described above. However, in some cases, one or more of the virtual airport module 250, the tower service coordinator 260, the external feed module 270, and the scheduling module 280 may utilize the processing circuitry 210 of the remote services module 200.

The virtual airport module 250 may include information associated with each respective airport that is associated with the system. In this regard, for example, the virtual airport module 250 may include images or renderings that show the approaches to and from the airport 170, along with maps, images or renderings of the runways, parking areas, terminal gates, service locations, etc., for the airport 170. Thus, for example, the aircraft 120 (or a pilot associated therewith) may request guidance, instructions, map data or a video preview of the airport 170 in preparation for landing. As such, when connected to the airport cell 180 (or when using the ATG network services if the backbone is provided by the ATG network—and therefore potentially out of range of the airport cell 180), the aircraft 120 (or pilot) may get an advanced view of the airport 170 to understand the layout of the airport 170, where to go after landing and how to get there. In an example embodiment, the virtual airport module 250 may not only be configured to serve information about the airport 170 on request, but the virtual airport module 250 may further be configured to synchronize with the position of the aircraft 120 to generate a virtual view based on current position of the aircraft 120. The pilot may therefore be enabled to correlate the actual view with the virtual information served thereto. However, the pilot may also, in some cases, be provided with an augmented reality view such that other traffic and objects at or near the airport 170 can also be displayed along with the graphical information otherwise provided by the virtual airport module 250 in association with the airport 170. Thus, the virtual airport module 250 can provide the pilot with visual or graphical information about the airport 170 either in advance or in real time (with or without augmented reality). For example, wake vortex information from other aircraft (including visual representations of the same) may be provided via the virtual airport module 250 as an augmented reality overlay, or as a warning without graphical representation. Additionally or alternatively, other weather factors such as wind speed and direction may be provided via the virtual airport model (again possibly as augmented reality overlays) to assist pilots in determining which end of the runway to approach and how traffic patterns are set up for the runway.

The tower service coordinator 260 may be configured (either with assistance from the operator 245 or independently) to provide various services that can normally be requested from a control tower at an attended airport. Thus, for example, the tower service coordinator 260 can be used to request turning runway lights on or off. The tower service coordinator 260 can also be used to manage queuing for incoming aircraft, and further provide directions or instructions to each incoming aircraft to control sequencing, merging, spacing or other traffic management services. The tower service coordinator 260 may also assign parking or terminal gate information or instructions, sometimes in connection with the virtual airport module 250 to graphically display the destination or directions for how to reach the destination. The tower service coordinator 260 may manage (and disseminate) schedule information (e.g., in cooperation with the scheduling module 280) for which runway is to be used, and for services (e.g., maintenance, fueling, de-icing, etc.) that are available at the airport 170.

The external feed module 270 may provide feeds of data to or from the aircraft 120 and/or the airport 170 for various regulatory, safety or other purposes. For example, automatic dependent surveillance-broadcast (ADS-B) data may be communicated from the aircraft 120 to the antenna assembly 185 and fed to the remote services module 200 to assist in performing the functions described above. For example, the ADS-B data may be used to inform the operator 245 (or at least the tower service coordinator 260 function of the remote services module 200) of the location of the aircraft 120 in real time so that, even for an unattended airport or an airport without radar tracking capabilities, the aircraft 120 can be tracked and monitored. In the augmented reality scenarios described above, ADS-B data may be used to facilitate provision of the augmented reality graphics that indicate or correlate to location of the aircraft 120. The external feed module 270 may also feed data (i.e., other aircraft ADS-B data) for wake vortex calculation and display. In some cases, the external feed module may feed data to the Federal Aviation Administration (FAA) for either air traffic control services (i.e., the operator 245) or other purposes. In some cases, the external feed module 270 may be used to communicate information that can ultimately be used to grant automated tower release or instrument flight rules (IFR) release.

As can be appreciated from the descriptions above, the remote services module 200 can provide a platform from which various airside and landside services can be coordinated for the aircraft 120 (or for other communication devices located at the airport 170). This is particularly useful at remote airports where the services provided by the remote services module 200 would otherwise not be provided, or would perhaps be provided at much greater cost to the public or private owners of the airport 170. Thus, the remote services module 200 may enable a dramatic increase in the ability to provide services (even at scale) to remote airports, unattended airports, or even to airports that would like to automate services to reduce operating costs.

The remote services module 200 may be fully operated by staff personnel who use the tools of the remote services module 200 (e.g., the sensor network 240, the virtual airport module 250, the tower service coordinator 260, and the external feed module 270) to monitor and manage airside and landside services for airports located remotely relative to the remote services module 200. However, the remote services module 200 may alternatively be fully automated so that the aircraft 120 can interact with the remote services module 200 to request and receive data (e.g., weather, traffic, or other situational information including live, preview or augmented reality graphical data), instructions, guidance or the like from the remote services module 200, which interfaces with devices on the ground (e.g., runway lights or other services at the airport 170) and with cloud services in addition to the aircraft 120. In such cases, the remote services module 200 may be configured or programmed with information that enables the aircraft 120 to make a request, and further enables the remote services module 200 to select the appropriate resources to fulfill the request based on information that can automatically be obtained in real time (e.g., ADS-B data) or that has been provided in advance or in real time by the aircraft 120 (or its pilot). In this regard, the remote services module 200 may be configured to determine the location of the aircraft 120, the airport 170 the aircraft 120 is nearest or at least is using as the destination (or departure) point, and then fulfill the request based on an understanding of the correct locational context of the aircraft 120.

In some embodiments, a combination of the live operator and automated (i.e., no operator) scenarios described above may be employed. For example, some services may be accessed without operator assistance and others may require operator assistance. Thus, for example, the type of service requested may dictate whether the service includes interaction with the operator 245 or not. Tower services could, for example, utilize the operator 245 whereas augmented reality or preview services do not. In other examples, the airport 170 could contract for access to the remote services module 200 during certain periods of time, and not during others. For example, the airport 170 may have periods of time where it subscribes to services from the remote services module 200 and other periods of time where it does not. The covered periods of time may be accessed by pilots by checking a website for the airport 170 and/or a service provider (e.g., the ATG network) that manages or otherwise provides the remote services module 200.

In some cases, a schedule for provision of services by the remote service module 200 may be prepared and executed in a programmatic way. The scheduling module 280 may be configured to manage scheduling of the remote service module 200 itself or of services associated therewith. Thus, the scheduling module 280 may be configured to operate as a scheduling assistant for the operator 245 and/or pilots or other users of the system. For pilots, individual services can be scheduled (e.g., landing times, gate arrivals, parking slots, maintenance services) at respective times where availability exists based on an interface with respective resource managers who may provide availability schedules to the scheduling module 280. For the operator 245, the same functionality that is available to the pilot (or other users) is also available. However, the operator 245 can also schedule accessibility time windows (and the nature of accessibility) for services themselves (i.e., for individual modules of the remote services module 200) and for the remote service module 200 itself.

In some cases, access to the remote service module 200 may be provided on a subscription basis. For example, some airports may have full service subscriptions and may have 24/7 coverage by an instance of the remote services module 200 either incorporating human operators or just incorporating automated functions or a combination of the two. Other airports may subscribe to the service on a limited basis and, during active hours/days, the remote services module 200 may be accessible by the aircraft 120 or by pilots/planners in advance of travel. In still other cases, the remote services module 200 may be offered as an "on-demand" service that is only activated when the aircraft 120 is one of a plurality of subscriber aircraft (or is a member of a fleet or airline that has subscribed). The remote service module 200 may therefore be accessed by pilots or planners that have a subscription to the service and provide credentials to authenticate their membership to the service and active subscription status. In such an example (or when the airport 170 is the subscriber), the services offered may depend on the subscription level of the pilot, planner or airport. Otherwise, instead of subscription based services, the remote services module 200 may be operated by a network (e.g., the ATG network) and all network users may have access on a basis that is dictated by the availability provided by each respective airport 170. For example, each airport 170 may have limited (scheduled) hours where access to the remote services module 200 is provided or access may be granted on a full time basis.

In some embodiments, the remote services module 200 may be configured to operate in a default mode until shifted into another mode. For example, the default mode may be an automated mode (i.e., without control by the operator 245) until the operator 245 takes manual control. However, the opposite could also be true such that the operator 245 has control by default until the operator 245 relinquishes control to an automated operation. Moreover, changes in how such operations occur may alternatively be conducted on an airport by airport (i.e., individual) basis. For example, the operator 245 may be enabled to manually shift a selected airport from among a list of all airports for which services are available between respective modes (operator control vs. automated control). Alternatively or additionally, shifts between operator control and automated control of the remote services module 200 (i.e., control mode shifts) may be accomplished via scheduled changes (e.g., automated control from 6 pm to 9 am and operator control from 9 am to 6 pm).

In an example embodiment, the remote services module 200 can also be accessed via the Internet independent of any connection to the airport cell 185. Thus, for example, a pilot may be enabled to access the remote services module 200 for planning purposes. In this regard, the pilot may be enabled to access the scheduling module 280 to check airport (or airport services) availability at respective future dates and times. The pilot may also schedule an arrival (or departure) at the airport 170 that has been selected via the scheduling module 280. The pilot may then, if applicable, schedule services associated with the arrival (or departure). The pilot may also interact with the virtual airport module 250 to either view images of the airport 170 or view video or simulation data descriptive of various aspects of operation in and around the airport 170. As such, the pilot can effectively scout the airport 170 in advance of arrival to familiarize (or re-familiarize) himself/herself with the airport 170 prior to use of the airport 170 in addition to scheduling any needed or desired services during the visit to the airport 170.

The nature of the services requested or scheduled may then dictate (dependent upon the situation) whether the remote services module 200 operates under operator control or automated control with respect to any or all of the services requested either in advance of or in real time while the aircraft 120 is approaching, departing or at the airport 170. However, the interactions with the remote services module 200 in real time (i.e., not in advance of arrival/departure) may occur through the airport cell 180.

As can be appreciated from the description above, an advantage of the backbone of the system being provided by the ATG network may be that interaction with the remote services module 200 in advance of the aircraft 120 being within range of the airport cell 180 can be accomplished while the aircraft 120 is airborne and perhaps even enroute to the airport 170. Moreover, when the backbone of the system is the ATG network, tracking information for the aircraft 120 can be provided to the remote services module 200 all along the route of the aircraft 120. As such, appointments for services can be modified and/or confirmed on the basis of the tracking. For example, if the tracking provided by the ATG network indicates a delay in progress of the aircraft 120 (e.g., due to weather), then the scheduling module 280 can proactively modify scheduling to accommodate the delay (if possible). Meanwhile, whether or not the aircraft 120 is on schedule, the approach to the airport cell 180 can be known so that a handover of communication from the ATG network to the airport cell 180 can be managed to improve the resilience of the wireless links and avoid dropping sessions.

Accordingly, example embodiments may enable information provision for airside or landside services into the cockpit, in real time, on the basis of connectivity to the airport cell 180. Moreover, the airport cell 180 can be setup effectively, via an "antenna on a stick," with out of the box connectivity to a nationwide backhaul network to effectively create a bubble of connectivity around any airport in the country. In some cases, multiple nationwide networks (e.g., cellular networks, ATG networks, etc.) may support individual ones of the airport cells 180 and one network (e.g., the ATG network) may act as a carrier aggregator to unify the services provided from the user's perspective. The carrier aggregator may also provide a carrier aggregation radio that can operate with all applicable networks and the airport cell 180. In any case, the end result is that information can be provided to power remote tower services, augmented reality vision systems, scheduling functions, and the provision of information about airports that otherwise are unattended or remote in order to make the information easier to consume including consumption in real time.

Figure 4:
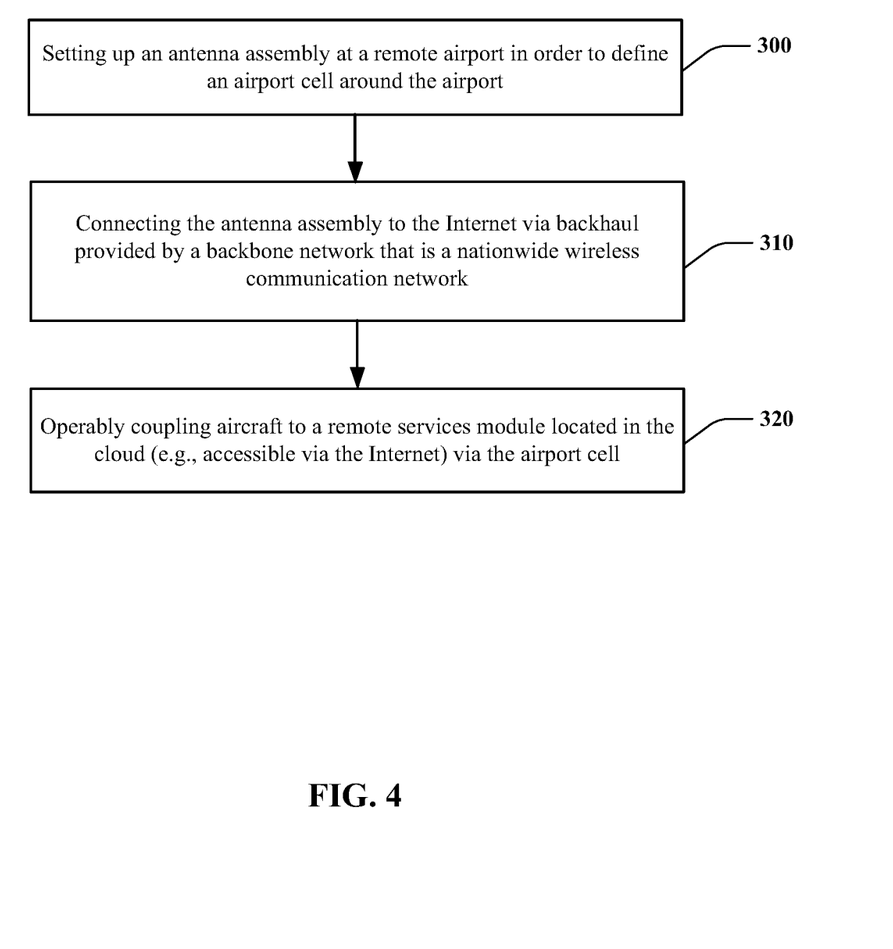
FIG. 4 illustrates a flow diagram of a method in accordance with an example embodiment.

FIG. 4 illustrates a general method for providing services to a remote airport in accordance with an example embodiment. As shown in FIG. 4, the method includes setting up an antenna assembly at a remote airport in order to define an airport cell around the airport at operation 300. The method further includes connecting the antenna assembly to the Internet via backhaul provided by a backbone network that is a nationwide wireless communication network at operation 310. The method further includes operably coupling aircraft to a remote services module located in the cloud (e.g., accessible via the Internet) via the airport cell at operation 320. Thereafter, landside and airside services can be provided to the aircraft via the remote services module as long as the aircraft employs a radio that is configured to communicate with the airport cell. In other words, the airport cell effectively operates as a communication hotspot, and the only requirement for an aircraft to receive services is that the aircraft carry a device (mobile or fixed) that is capable of communicating with the airport cell (i.e., the bubble) using the communication protocols employed by the airport cell (e.g., 4G LTE, 5G, or other protocols).

Thus, in accordance with an example embodiment, a system for providing services to remote airports is provided. The system may include a backbone network, an antenna assembly and a remote services module. The backbone network may operate using first assigned RF spectrum and be configured to provide backhaul services and network control to operably couple one or more base stations of the backbone network to the Internet. The antenna assembly may be disposed at a remote airport to define an airport cell and is configured to communicate wirelessly with an aircraft located in the airport cell via second assigned RF spectrum. The antenna assembly may be operably coupled to the backbone network for backhaul to the Internet. The remote services module may be accessible by the aircraft both in flight and on the ground within the airport cell via the antenna assembly. The remote services module may include processing circuitry configuring the remote services module to provide the aircraft or communication devices thereon with access to obtain airside or landside services associated with the remote airport.

In some embodiments, the system may include additional, optional features, and/or the features described above may be modified or augmented. Some examples of modifications, optional features and augmentations are described below. It should be appreciated that the modifications, optional features and augmentations may each be added alone, or they may be added cumulatively in any desirable combination. In an example embodiment, the backbone network comprises an ATG network. In an example embodiment, the ATG network may be configured to track and communicate with the aircraft while the aircraft is in-flight, and the ATG network may communicate position information of the aircraft to the remote services module. In some cases, a handover of communication between the ATG network and the airport cell may be conducted at a boundary of the airport cell. In an example embodiment, the remote airport is an unattended airport, and the remote services module may enable a remotely located operator, relative to the unattended airport, to provide tower services to the aircraft via the airport cell. In some cases, the remote airport is an unattended airport, and the remote services module may enable a remotely located operator, relative to the unattended airport, to provide instructions to the aircraft for accessing ground based services of the unattended aircraft via the airport cell. In an example embodiment, the remote services module may be operably coupled to a sensor network of the remote airport to provide information obtained by the sensor network to the aircraft via the airport cell. In some cases, the information obtained by the sensor network includes wind direction, wind speed, and other weather information, traffic information, parking information, or wake vortex information associated with the remote airport. In an example embodiment, the remote services module may be operably coupled to a virtual airport module comprising images, video or models of the remote airport to provide the images, video or models to the aircraft via the airport cell prior to or during takeoff or landing of the aircraft. In some cases, the virtual airport module may be accessible via the Internet independent of the airport cell, and a pilot of the aircraft is enabled to access the virtual airport module in advance of travel via the Internet independent of the airport cell. In an example embodiment, the virtual airport module may be configured to provide an augmented reality view of the remote airport in real time based on position information of the aircraft via the airport cell. In some cases, the remote services module may be operably coupled to a scheduling module, and the scheduling module may be configured to enable scheduling of an arrival to or departure from the remote airport. In an example embodiment, the remote services module may be operably coupled to a scheduling module, and the scheduling module may be configured to enable scheduling of services for the aircraft at the remote airport. Alternatively or additionally, the scheduling module may be configured to enable scheduling of an operational mode of the remote services module. In an example embodiment, the operational mode may be an automated mode via which the remote services module employs programmed rules to interface with the aircraft or communication devices associated therewith. In some cases, the operational mode may be an operator controlled mode via which an operator located remotely relative to the remote airport utilizes the remote services module to interface with the aircraft or communication devices associated therewith. In an example embodiment, the remote services module may be operably coupled to an external feed module configured to feed data associated with the aircraft to an external entity. In some cases, the remote services module may be operably coupled to a plurality of antenna assemblies of a respective plurality of remote airports. In an example embodiment, a plurality of instances of the remote services module may be employed to interface with groups of airport cells based on traffic volume criteria. In some cases, a plurality of instances of the remote services module may be employed to interface with groups of airport cells based on geographic criteria.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

What is claimed is:

1. A system comprising:
a backbone network comprising an air-to-ground (ATG) network configured to provide backhaul services and network control to operably couple one or more base stations of the backbone network to the Internet, the backbone network operating using first assigned radio frequency (RF) spectrum transmitted from the one or more base stations to communicate with distant aircraft within a first range defined by a communication range of the one or more base stations;
an antenna assembly disposed at a remote airport to define an airport cell extending beyond the remote airport by a second range defined by a communication range of the antenna assembly that is less than the first range, the antenna assembly being configured to communicate wirelessly with an aircraft located in the airport cell via second assigned RF spectrum that is different than the first assigned RF spectrum, the antenna assembly being operably coupled to the backbone network for backhaul to the Internet by ATG backhaul and network control components common to both the backbone network and the antenna assembly; and
a remote services module accessible by the aircraft both in flight and on the ground within the airport cell via the antenna assembly, the remote services module being operably coupled to the ATG backhaul and network control components via the Internet,
wherein the remote services module comprises processing circuitry configuring the remote services module to provide the aircraft or communication devices thereon with access to obtain airside or landside services associated with the remote airport.

2. The system of claim 1, wherein the ATG network is configured to track and communicate with the aircraft while the aircraft is in-flight, and
wherein the ATG network communicates position information of the aircraft to the remote services module and to other aircraft for vehicle-to-vehicle (V2V) functions.

3. The system of claim 2, wherein a handover of communication between the ATG network and the airport cell is conducted at a boundary of the airport cell.

4. The system of claim 1, wherein the remote airport is an unattended airport, and
wherein the remote services module enables a remotely located operator, relative to the unattended airport, to provide tower services to the aircraft via the airport cell.

5. The system of claim 1, wherein the remote airport is an unattended airport, and
wherein the remote services module enables a remotely located operator, relative to the unattended airport, to provide instructions to the aircraft for accessing ground based services of the unattended aircraft via the airport cell.

6. The system of claim 1, wherein the remote services module is operably coupled to a sensor network of the remote airport to provide information obtained by the sensor network to the aircraft via the airport cell.

7. The system of claim 6, wherein the information obtained by the sensor network includes weather information, traffic information, parking information, or wake vortex information associated with the remote airport.

8. The system of claim 1, wherein the remote services module is operably coupled to a virtual airport module comprising images, video or models of the remote airport to provide the images, video or models to the aircraft via the airport cell prior to or during takeoff or landing of the aircraft.

9. The system of claim 8, wherein the virtual airport module is accessible via the Internet or an intranet independent of the airport cell, and
wherein a pilot of the aircraft is enabled to access the virtual airport module in advance of travel via the Internet independent of the airport cell.

10. The system of claim 8, wherein the virtual airport module is configured to provide an augmented reality view of the remote airport in real time based on position information of the aircraft via the airport cell.

11. The system of claim 1, wherein the remote services module is operably coupled to a scheduling module, and
wherein the scheduling module is configured to enable scheduling of an arrival to or departure from the remote airport.

12. The system of claim 1, wherein the remote services module is operably coupled to a scheduling module, and
wherein the scheduling module is configured to enable scheduling of services for the aircraft at the remote airport.

13. The system of claim 1, wherein the remote services module is operably coupled to a scheduling module, and
wherein the scheduling module is configured to enable scheduling of an operational mode of the remote services module.

14. The system of claim 13, wherein the operational mode is an automated mode via which the remote services module employs programmed rules to interface with the aircraft or communication devices associated therewith.

15. The system of claim 13, wherein the operational mode is an operator controlled mode via which an operator located remotely relative to the remote airport utilizes the remote services module to interface with the aircraft or communication devices associated therewith.

16. The system of claim 1, wherein the remote services module is operably coupled to an external feed module configured to feel data associated with the aircraft to an external entity.

17. The system of claim 1, wherein the remote services module is operably coupled to a plurality of antenna assemblies of a respective plurality of remote airports.

18. The system of claim 17, wherein a plurality of instances of the remote services module are employed to interface with groups of airport cells based on traffic volume criteria.

19. The system of claim 17, wherein a plurality of instances of the remote services module are employed to interface with groups of airport cells based on geographic criteria.

* * * * *